United States Patent
Cooper et al.

(10) Patent No.: US 10,239,150 B2
(45) Date of Patent: Mar. 26, 2019

(54) ULTRASONIC WELDING OF COMPOSITES USING C FRAME TOOLING

(71) Applicant: GM Global Technology Operations LLC, Detroit, MI (US)

(72) Inventors: Fred C. Cooper, Troy, MI (US); Bradley J. Blaski, Sterling Heights, MI (US); David J. Stasiak, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 560 days.

(21) Appl. No.: 14/564,218

(22) Filed: Dec. 9, 2014

(65) Prior Publication Data
US 2016/0158876 A1    Jun. 9, 2016

(51) Int. Cl.
B32B 37/00  (2006.01)
B23K 20/10  (2006.01)
B29C 65/08  (2006.01)
B23K 37/02  (2006.01)
(Continued)

(52) U.S. Cl.
CPC ............ B23K 20/10 (2013.01); B23K 20/106 (2013.01); B23K 37/0235 (2013.01); B29C 65/08 (2013.01); B29C 66/349 (2013.01); B29C 66/8181 (2013.01); B29C 66/8322 (2013.01); B29C 66/863 (2013.01); B29C 66/21 (2013.01); B29C 66/3494 (2013.01); B29L 2031/3055 (2013.01)

(58) Field of Classification Search
CPC .. B32K 20/10; B23K 20/106; B23K 37/0235; B29C 65/08; B29C 66/349; B29C 66/8181; B29C 66/8322; B29C 66/863

USPC .................... 156/73.1, 580.1, 580.2
See application file for complete search history.

(56) References Cited

U.S. PATENT DOCUMENTS 3,602,421 A  *  8/1971  Spratt, Jr. ............ B23K 20/106
                                                    156/580.2
3,734,805 A  *  5/1973  Obeda .................... B29C 65/086
                                                    156/580.1
(Continued)

FOREIGN PATENT DOCUMENTS

CN      201186490 Y     1/2009
CN      201399653 Y     2/2010
(Continued)

OTHER PUBLICATIONS

German Office Action dated Jul. 4, 2017 ; Application No. 10 2015 120 367.7; Applicant: GM Global Technology Operations LLC.; 5 pages.
(Continued)

Primary Examiner — James D Sells
(74) Attorney, Agent, or Firm — BrooksGroup

(57) ABSTRACT

A number of variations may include a weld gun and a method of operating the weld gun including a motor operably coupled to a converter. The converter may be operably coupled to a booster. A horn may be operably coupled to the booster. An anvil may be operably coupled to the horn wherein vibration of the horn may be caused by the motor. Moreover, the vibration of the horn may produce heat in order to weld a piece which may be disposed adjacent to the horn. The weld gun may not require separate or additional tooling.

20 Claims, 3 Drawing Sheets

(51) Int. Cl.
*B29C 65/00* (2006.01)
*B29L 31/30* (2006.01)

(56) References Cited

U.S. PATENT DOCUMENTS

| | | | | |
|---|---|---|---|---|
| 4,333,791 A | * | 6/1982 | Onishi | B29C 65/087 |
| | | | | 156/580.1 |
| 4,750,970 A | * | 6/1988 | Malosh | B29C 65/08 |
| | | | | 156/580.1 |
| 5,061,331 A | * | 10/1991 | Gute | B26D 7/018 |
| | | | | 156/251 |
| 5,085,719 A | * | 2/1992 | Eck | B29C 65/08 |
| | | | | 156/580.1 |
| 5,137,200 A | * | 8/1992 | Edwards | B29C 65/08 |
| | | | | 228/1.1 |
| 5,520,774 A | * | 5/1996 | Palacios | B29C 66/80 |
| | | | | 112/258 |
| 2003/0066862 A1 | | 4/2003 | Popoola et al. | |
| 2011/0014013 A1 | | 1/2011 | Williamson | |

FOREIGN PATENT DOCUMENTS

| | | |
|---|---|---|
| CN | 201559026 U | 8/2010 |
| CN | 103448243 A | 12/2013 |
| DE | 4101545 A1 | 7/1992 |
| DE | 20022186 U1 | 4/2001 |

OTHER PUBLICATIONS

Chinese Office Action dated Apr. 27, 2017; Application No. 201510899710.7; Applicant: GM Global Technology Operations LLC.; 6 pages.

Chinese Office Action dated Nov. 5, 2018; Application No. 201510899710.7; Applicant GM Global Technology Operations LLC.; 8 pages.

* cited by examiner

ULTRASONIC WELDING OF COMPOSITES USING C FRAME TOOLING

TECHNICAL FIELD

The field to which the disclosure generally relates to includes vehicle production systems including welding systems.

BACKGROUND

Vehicle production systems include various welding mechanisms.

SUMMARY OF ILLUSTRATIVE VARIATIONS

A number of variations may include a weld gun which includes a motor operably coupled to a converter. The converter may be operably coupled to a booster. A horn may be operably coupled to the booster. An anvil may be operably coupled to the horn. The horn may be constructed and arranged to vibrate and the vibration of the horn may produce heat in order to weld a piece disposed adjacent to the horn.

A number of other variations may include an ultrasonic weld gun which may include a motor operably coupled to a converter. Additionally, the converter may be operably coupled to a horn. Moreover, the horn may be operably coupled to an anvil. The horn may be constructed and arranged to vibrate and may produce heat in order to weld a piece disposed adjacent to the horn.

Yet another variation may include a method of welding comprising first operating a motor. The motor may be operably coupled to a converter. Moreover, the converter may be operably coupled to a booster. Next, mechanical energy may be transferred into a horn. The horn may be operably coupled to the booster. Next, heat may be produced by vibrating the horn in order to weld a piece disposed adjacent to the horn. Finally, an integral anvil may be used instead of a separate tooling during the welding process.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figures 1, 2:
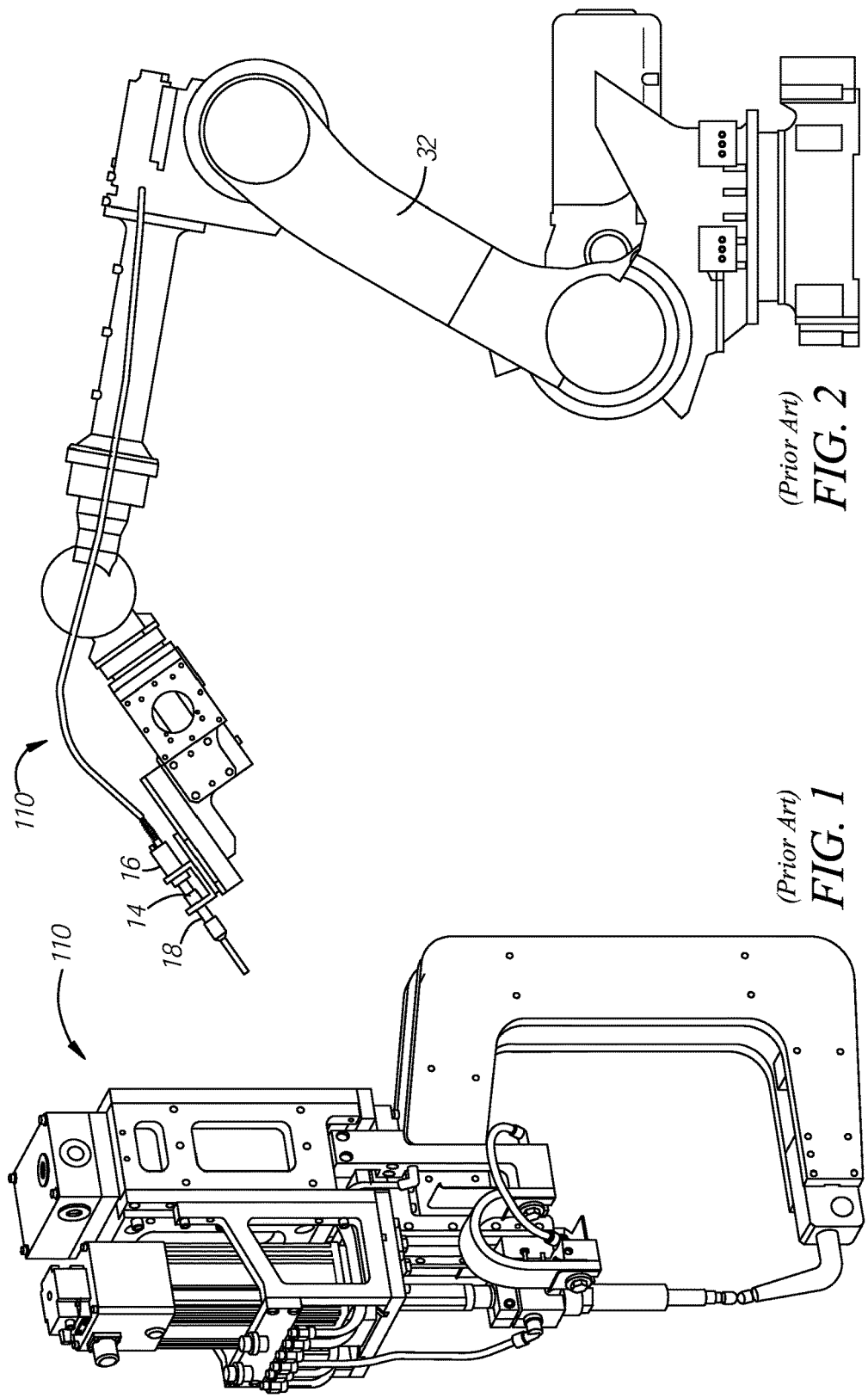
FIG. 1 shows a prior art welding gun.
FIG. 2 shows the prior art welding gun according to a number of variations.

The following description of the variations is merely illustrative in nature and is in no way intended to limit the scope of the invention, its application, or uses.

Referring to FIGS. 3-6 a weld gun 10 may include a motor 12 operably coupled to a converter 16. The converter 16 may be operably coupled to a horn 18. Moreover, an anvil 20 may be operably coupled to the horn 18. Vibration of the horn 18 may produce heat in order to weld a piece 22 which may be disposed adjacent to the horn 18.

FIGS. 1 and 2 show a prior art servo driven weld gun 110. FIG. 1 shows the weld gun 110 which—may use electrical current in order to produce a weld. Additionally, FIG. 2 shows the prior art welding gun 110 may use mechanical energy to produce a weld.

Figure 3:
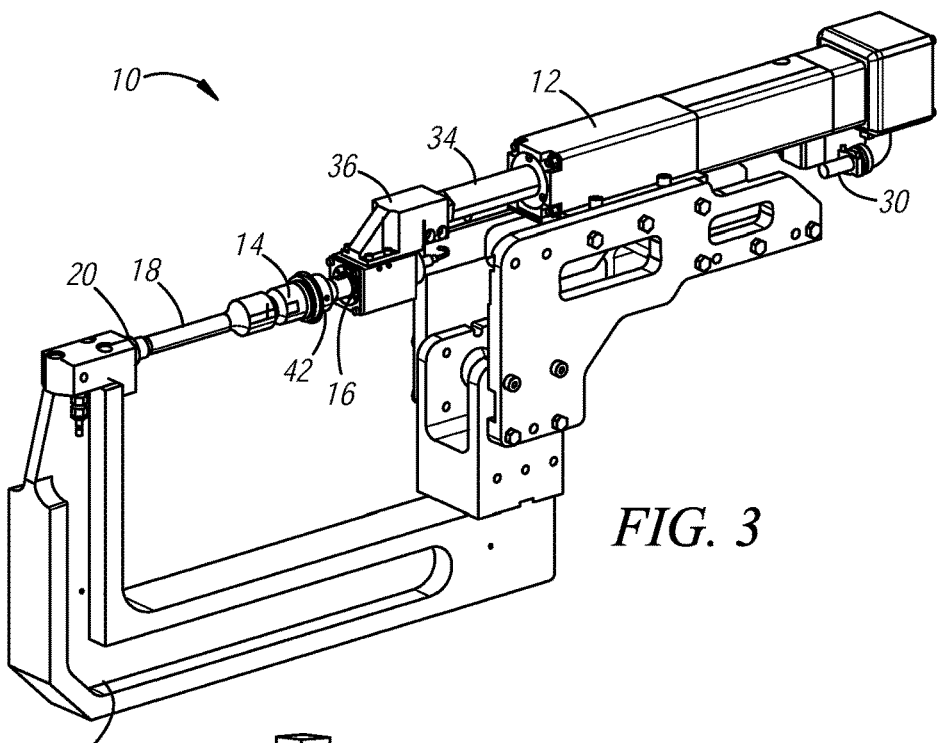
FIG. 3 shows a weld gun according to a number of variations.
Figures 4, 6:
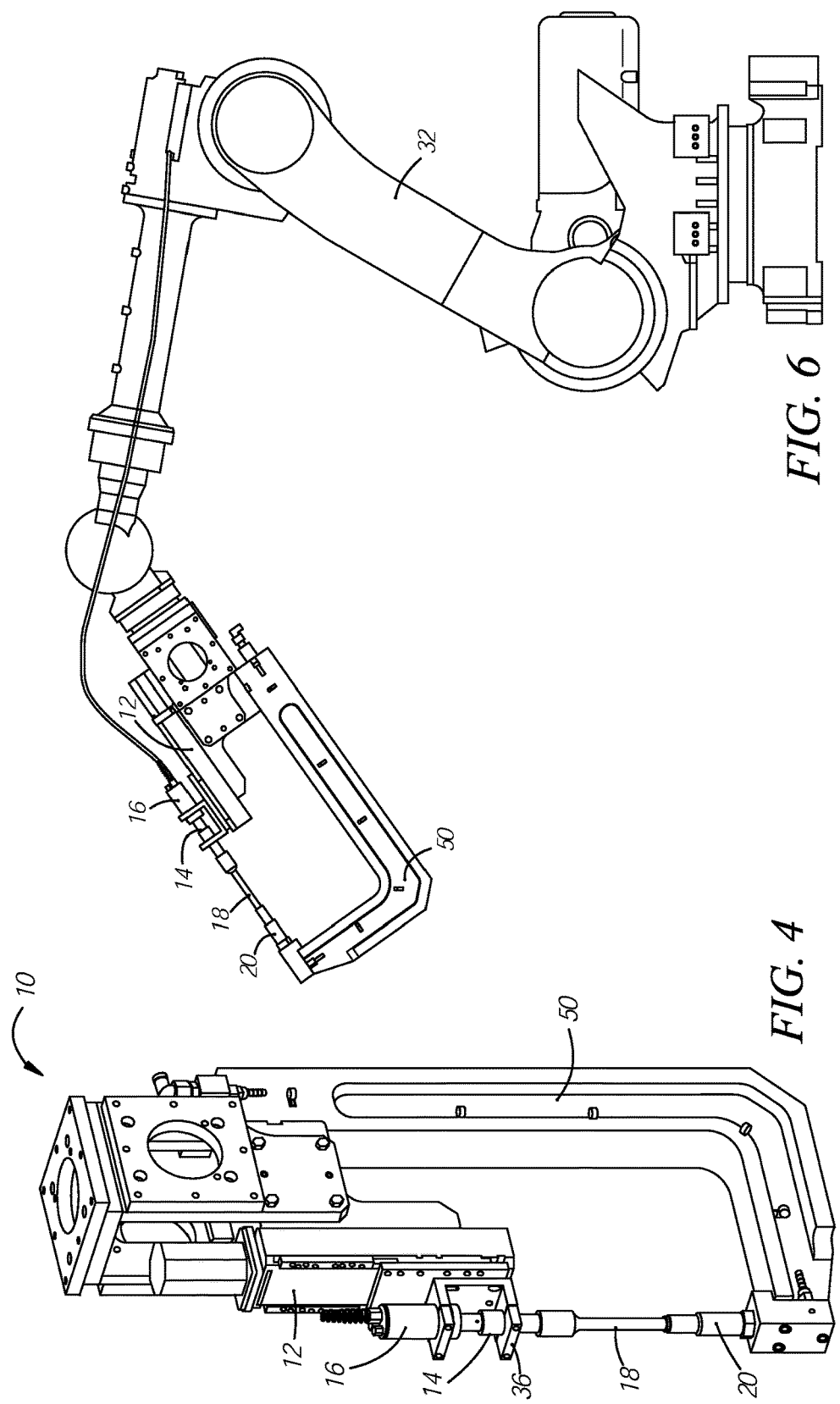
FIG. 4 shows the weld gun according to a number of variations.
FIG. 6 shows the weld gun according to a number of variations.

Referring now to FIG. 3, the weld gun 10 may include the motor 12. The motor 12 may be a servo motor as known by one of ordinary skill in the art or may be any other type of motor as desired by one of ordinary skill in the art. The motor 12 may provide the rest of the weld gun 10 with the necessary force in order to weld the piece 22. The motor 12 may also include connector fittings 30 which may be constructed and arranged to operably couple the motor 12 and to a robot 32, as shown in FIG. 6. The connector fittings 30 may be any type of fittings as known by one of ordinary skill in the art.

Figure 5:
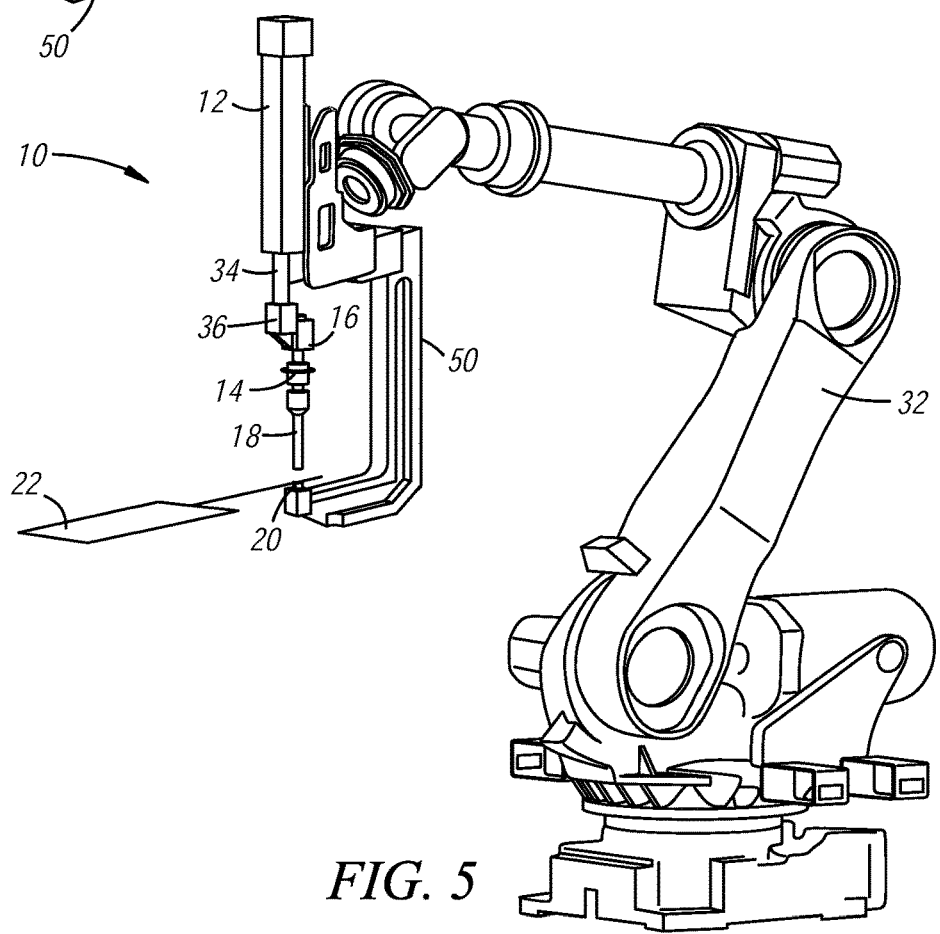
FIG. 5 shows a weld gun according to a number of variations.

Referring now to FIGS. 3-5, a cylinder 34 may be operably coupled to the motor 12. The motor 12 may move back and forth along the cylinder 34 during operation and may produce a force. Additionally, the cylinder 34 may house various wires or other connectivity features which may connect the motor 12 to other features of the weld gun 10. It is also contemplated that the cylinder 34 additionally may be configured to apply force produced by the motor 12 to the piece 22, as illustrated in FIG. 5. Moreover, a bracket 36 may be operably coupled to the cylinder 34. The bracket 36 may be a square or rectangular bracket as illustrated in FIG. 3. It is also contemplated that the bracket 36 may be of any other type or shape as known by one of ordinary skill in the art. Moreover, the bracket 36 may also be configured to join the motor 12 to the remainder of the weld gun 10.

The converter 16 may be operably coupled to the bracket 36. Moreover, the booster 14, if used, and the converter 16 may be operably coupled. The converter 16 may also include cooling air in order to cool the piece 22, or the horn 18 following the welding process. The converter 16 may additionally include at least one, and possibly include a plurality of, apertures 42 which may allow the air to leave the converter 16 and be distributed to the horn 18. Moreover, it is contemplated that the converter 16 may operably couple with the robot 32 using other connectivity means as known by one of ordinary skill in the art.

The converter 16 may include aluminum or any other material as known by one of ordinary skill in the art which can withstand the force produced by the motor 12. Additionally, the horn 18 may be constructed and arranged to convert the electrical energy into mechanical energy for the ultrasonic welding process. It is contemplated that electrical energy, or other form of energy, may be produced by a generator or any other mechanism as known by one of ordinary skill in the art. Moreover, the booster 14 may be configured to boost the energy which has been converted by the converter 16. The booster 14 may also be configured to fine tune the amplitude of energy coming from the converter 16. The booster 14 may increase the amplitude or decrease the amplitude or may keep the amplitude the same as desired by one of ordinary skill in the art.

Referring to FIGS. 3-5, the horn 18 may be operably coupled to the booster 14. It is also contemplated that the horn 18 may be operably coupled to the converter 16 if no booster 14 is employed. The horn 18 may be configured to transfer the mechanical energy converted by the converter 16 to the piece 22 in order to weld the piece 22, as illustrated in FIG. 5. Moreover, the horn 18 may be constructed and arranged to fine tune the amplitude coming from the booster 14. The horn 18 may also be configured to apply force to the piece 22. It is contemplated that the horn 18 may apply a force of approximately 40 pounds-force to approximately 250 pounds-force. The motor 12 may also be configured to produce force which may vibrate the horn 18. It is contemplated that the horn 18 may vibrate at approximately 250-60,000 vibrations per second. The vibrations may cause heat which may be applied to the piece 22 in order to weld the piece 22, as illustrated in FIG. 6.

It is also contemplated that the weld gun 10 may have an energy recycling mechanism in which force produced by the motor 12 and converted in the converter 16 may be recycled back to the motor 12. As illustrated in FIGS. 3 and 4, the horn 18 may be generally cylindrical in shape in order to provide optimal surface area to the piece. However, it is also contemplated that the horn 18 may be of any other shape including but not limited to circular, triangular, or pointed. The horn 18 may include aluminum, steel, titanium, or any other material as known by one of ordinary skill in the art.

Referring again to FIGS. 3 and 4, an arm 50 may be operably coupled to the anvil 20. As illustrated in FIGS. 3 and 4, the arm 50 may extend from the anvil 20 and may curve such that the arm becomes parallel with the motor 12 and converter 16. As also illustrated in FIGS. 3 and 4, the arm 50 may include one or more divoted or sloped portions in order to accommodate coupling with the robot 32. The arm 50 may be comprised of steel, copper, or any other material as known by one of ordinary skill in the art that would provide the necessary strength of the arm 50. It is also contemplated that the arm may include a water chamber. The water chamber may be constructed and arranged to store and supply water to the piece 22. The water may be deployed during the welding process to cool down the anvil 20.

The horn 18 may be also operably coupled with the anvil 20. The anvil 20 may be disposed between the horn 18 and the arm 50 and may be configured to eliminate additional and/or separate tooling. The anvil 20 may include steel, iron, aluminum or any other material as known by one of ordinary skill in the art. Additionally, the anvil 20 may be of any shape as known by one of ordinary skill in the art. It is contemplated that the anvil 20 may be integrally formed with the horn 18. The anvil 20 also may be integrally formed with the arm 50 and may include a space between the anvil 20 and the horn 18 which may be constructed and arranged to hold the piece 22 in the space. It is also contemplated, as illustrated in FIGS. 3 and 4, the horn 18, arm 50 and anvil 20 may be part of a single integral weld gun.

It is contemplated that the weld gun 10 may be operably coupled to a controller. The controller may be disposed on the robot 32 or in another location easily accessible to a user. The controller may be configured to operate the weld gun. More specifically, the controller may be configured to operate the motor at various power outputs for various lengths of time. It is additionally contemplated that the weld gun 10 may be additionally or alternatively controlled by the robot 32 itself, the generator, or other mechanism as known by one of ordinary skill in the art.

Referring now to the variation illustrated in FIGS. 5 and 6, in operation, the weld gun 10 may be operably coupled to the robot 32. The robot 32 may be configured to position the weld gun in the desired location in order to facilitate the welding process. In operation, the motor 12 may produce force by traveling back and forth along the cylinder 34. The converter 16 may convert the force produced by the motor 12 and may additionally or alternatively convert the electrical energy which may be produced by the generator into mechanical energy. The converter 16 may then transfer the converted energy to the booster 14. The booster 14 may fine tune the amplitude of the energy before transferring the energy to the horn 18. This may cause the horn 18 to vibrate up and down causing heat which may weld the piece 22 which may be disposed between the horn 18 and the anvil 20. The converter 16 may also house cool air which may be distributed to cool the part before, during or after the welding process. The horn 18 may be configured to transfer the mechanical energy to melt the material. Additionally, if a booster is used, the horn 18 may fine tune the amplitude coming from the booster. The anvil 20 may be disposed on an opposite side of the piece 22 and may prevent the horn 18 from bending or otherwise damaging the piece 22. The anvil 20 may be integral and may replace all other tooling such that no additional or separate tooling is necessary to produce the final product. The weld gun 10 may also be configured to ultra-sonically weld the piece 22 disposed adjacent to the weld gun 10. It is also contemplated that the weld gun may be configured to weld the piece 22 using other welding methods including but not limited to resistance spot welding.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a weld gun including a converter may be operably coupled to a booster. A horn may be operably coupled to the booster. Additionally, an anvil may operably coupled to the horn. Vibration of the horn may be caused by the converter and the vibration of the horn may produce heat in order to weld a piece which may be disposed adjacent to the horn.

Variation 2 may include a weld gun as set forth in Variation 1 wherein the vibrations may be caused by electrical current and transferred into mechanical energy by the converter.

Variation 3 may include a weld gun as set forth in any of Variations 1 or 2 wherein the weld gun may be operably coupled to a robot or a robotic system.

Variation 4 may include a method as set forth in any of Variations 1-3 wherein the weld gun may include no additional tooling for the welding process.

Variation 5 may include a weld gun as set forth in any of Variations 1-4 wherein the mechanical energy may be moved through the booster and the converter before causing vibrations of the horn.

Variation 6 may include a weld gun as set forth in any of Variations 1-5 wherein the horn may fine tune the amplitude coming from the booster and may apply the appropriate amplitude to the piece.

Variation 7 may include a weld gun as set forth in any of Variations 1-6 wherein the weld gun may be an ultrasonic weld gun.

Variation 8 may include an ultrasonic weld gun which may include a motor operably coupled to a converter. The converter may be operably coupled to a booster along with a horn operably coupled to the booster. Additionally, an anvil may be operably coupled to the horn and vibration of the horn may be caused by the motor. The horn may vibrate to produce heat in order to weld a piece which may be disposed adjacent to the horn.

Variation 9 may include a method as set forth in Variation 8 wherein the vibrations may be caused by mechanical energy.

Variation 10 may include the ultrasonic weld gun as set forth in any of Variations 8 and 9 wherein the weld gun may be operably coupled to a robot or a robotic system.

Variation 11 may include the ultrasonic weld gun as set forth in any of Variations 8-10 wherein no additional tooling may be used for the welding process.

Variation 12 may include an ultrasonic weld gun as set forth in any of Variations 8-11 wherein the energy produced by the converter may be moved through the booster and through the converter before causing vibrations of the horn.

Variation 13 may include an ultrasonic weld gun as set forth in any of Variations 8-12 wherein the horn may fine tune the amplitude coming from the booster and may apply the appropriate amplitude to the piece.

Variation 14 may include a welding method including operating a motor wherein the motor may be operably coupled to a converter. Next, transferring energy produced by the converter through a booster and into a horn, wherein the horn may be operably coupled to the booster. Next, heat may be produced by vibrating the horn in order to weld a piece disposed adjacent to the horn. Finally, an integral anvil may be used instead of separate tooling during the welding process.

Variation 15 may include a method as set forth in Variation 14 wherein the motor may be operably coupled to a robot or a robotic system.

Variation 16 may include a method as set forth in any of Variations 14 or 15 wherein no additional tooling may be used for the welding process.

Variation 17 may include a method as set forth in any of Variations 14-16 wherein the force produced by the motor may be moved through the booster and the converter before causing vibrations of the horn.

Variation 18 may include a method as set forth in any of Variations 14-17 wherein the horn may fine tune the amplitude coming from the booster and may apply the appropriate amplitude to the piece.

Variation 19 may include a method as set forth in any of Variations 14-18 wherein the welding method may be an ultrasonic welding method.

Variation 20 may include a method as set forth in any of Variations 14-19 wherein the anvil may be operably coupled to an arm.

The above description of select variations within the scope of the invention is merely illustrative in nature and, thus, variations or variants thereof are not to be regarded as a departure from the spirit and scope of the invention.

What is claimed is:

1. A weld gun consisting essentially of:
   a motor operably coupled to a converter;
   a horn operably coupled to the converter, the horn being constructed and arranged to vibrate at about 250 vibrations per second to about 60,000 vibrations per second; and
   an anvil disposed inline and opposite the horn and integrated with an arm; the horn, the arm, and the anvil forming a single integral weld gun absent additional structural connection elements, wherein the horn is constructed and arranged to vibrate and wherein the vibration of the horn produces heat to weld a piece disposed between the horn and the anvil.

2. The weld gun of claim 1, wherein the vibrations are caused by mechanical energy.

3. The weld gun of claim 1, wherein the weld gun is operably coupled to a robot or a robotic system.

4. The weld gun of claim 1, wherein no additional tooling is used to weld the piece disposed between the horn and the anvil.

5. The weld gun of claim 2, wherein the mechanical energy is produced by the converter.

6. The weld gun of claim 5, wherein the horn fine tunes the amplitude coming from the booster and applies the appropriate amplitude to the piece.

7. The weld gun of claim 1, wherein the weld gun is an ultrasonic weld gun.

8. An ultrasonic weld gun consisting essentially of:
   a motor operably coupled to a converter;
   a booster operably coupled to the converter;
   a horn operably coupled to the booster; and
   an anvil integrated with an arm and the horn to form a single integral weld gun absent additional structural connection elements, wherein the horn is constructed and arranged to vibrate; and
   wherein the horn vibrates at about 250 vibrations per second to about 60,000 vibrations per second to produce heat to weld a piece disposed adjacent to the horn and wherein the horn is constructed and arranged to apply a force of about 40 pounds-force to about 250 pounds-force to the piece.

9. The ultrasonic weld gun of claim 8, wherein the vibrations are caused by mechanical energy produced by the converter.

10. The ultrasonic weld gun of claim 8, wherein the weld gun is operably coupled to a robot or a robotic system.

11. The ultrasonic weld gun of claim 8, wherein no additional tooling is used to weld the piece disposed adjacent to the horn.

12. The ultrasonic weld gun of claim 8, wherein the mechanical energy is moved through the booster and the converter before causing the vibrations of the horn.

13. The ultrasonic weld gun of claim 12, herein the horn fine tunes the amplitude coming from the booster and applies the appropriate amplitude to the piece.

14. A welding method consisting of:
   operating a motor wherein the motor is operably coupled to a converter;
   transferring energy from the converter into a horn, wherein the horn is operably coupled to the converter;
   producing heat by vibrating the horn at about 250 vibrations per second to about 60,000 vibrations per second in order to weld a piece disposed adjacent to the horn; and wherein the horn is constructed and arranged to apply a force of about 40 pounds-force to about 250 pounds-force to the piece; and
   wherein the anvil is integrally formed with an arm and the horn as part of a single integral weld gun absent additional structural connection elements.

15. The welding method of claim 14, wherein no additional tooling is used to weld the piece disposed adjacent to the horn.

16. The welding method of claim 14, wherein the mechanical energy is moved through a booster and the converter before causing the vibrations of the horn.

17. The welding method of claim 16, wherein the horn fine tunes the amplitude coming from the booster and applies the appropriate amplitude to the piece.

18. The welding method of claim 14, wherein the welding method is an ultrasonic welding method.

19. The welding method of claim 14, wherein the anvil is operably coupled to an arm.

20. The welding method of claim 14, wherein the arm is operably coupled to a robot or a robotic system.

* * * * *